US009643567B2

United States Patent
Stein

(10) Patent No.: US 9,643,567 B2
(45) Date of Patent: May 9, 2017

(54) MOTOR VEHICLE WITH FOLDABLE BACKSEAT AND SAFETY BELT ASSIGNED TO THE SAME

(71) Applicant: GM GLOBAL TECHNOLOGY OPERATIONS LLC, Detroit, MI (US)

(72) Inventor: Martin Stein, Guntersblum (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 184 days.

(21) Appl. No.: 14/711,374

(22) Filed: May 13, 2015

(65) Prior Publication Data
US 2015/0336536 A1 Nov. 26, 2015

(30) Foreign Application Priority Data

May 24, 2014 (DE) .................. 10 2014 007 946

(51) Int. Cl.
| | | |
|---|---|---|
| *B60R 22/26* | (2006.01) | |
| *B60N 2/20* | (2006.01) | |
| *B60R 22/00* | (2006.01) | |
| *B60N 2/36* | (2006.01) | |
| *B60R 22/02* | (2006.01) | |
| *B60R 22/18* | (2006.01) | |

(52) U.S. Cl.
CPC .............. *B60R 22/26* (2013.01); *B60N 2/206* (2013.01); *B60N 2/36* (2013.01); *B60R 22/00* (2013.01); *B60R 22/02* (2013.01); *B60R 2022/1818* (2013.01); *B60R 2022/266* (2013.01)

(58) Field of Classification Search
CPC ......... B60R 22/26; B60R 22/00; B60R 22/02; B60N 2/206; B60N 2/36
USPC ......................................................... 297/483
See application file for complete search history.

(56) References Cited

U.S. PATENT DOCUMENTS

| | | | | |
|---|---|---|---|---|
| 5,692,803 | A * | 12/1997 | Luik ...................... | B60N 2/366 |
| | | | | 297/483 |
| 8,646,845 | B2 * | 2/2014 | Varcus .................. | B60N 2/688 |
| | | | | 297/483 |
| 2012/0025557 | A1 * | 2/2012 | Lindsay ................. | B60N 2/366 |
| | | | | 297/483 |

FOREIGN PATENT DOCUMENTS

| | | |
|---|---|---|
| DE | 102011113923 A1 | 3/2013 |
| DE | 102011118013 A1 | 5/2013 |
| JP | H1071929 A | 3/1998 |
| JP | 2003267185 A | 9/2003 |
| SE | DE 19724279 A1 * 12/1997 ............. B60R 22/02 |

OTHER PUBLICATIONS

German Patent Office, German Search Report for German Application No. 102014007946.5, dated Jan. 14, 2015.

* cited by examiner

*Primary Examiner* — Anthony D Barfield
(74) *Attorney, Agent, or Firm* — Lorenz & Kopf, LLP

(57) ABSTRACT

A backrest for a back seat of a motor vehicle is pivotable between a usage and folded position. A lateral part is arranged next to the backrest in usage position and forms a gap therebetween. A safety belt adjacent to the gap rests on a contact surface of the lateral part. A guide element is arranged in the gap and mounted in the lateral part for moving from an operative position partially projecting out of the gap and too a non-operative position completely retracted in the gap and vice versa. The guide element projects over the contact surface in the operative position. The guide element is moved from the operative position into the non-operative position against a spring force when the backrest pivots into the usage position.

12 Claims, 8 Drawing Sheets

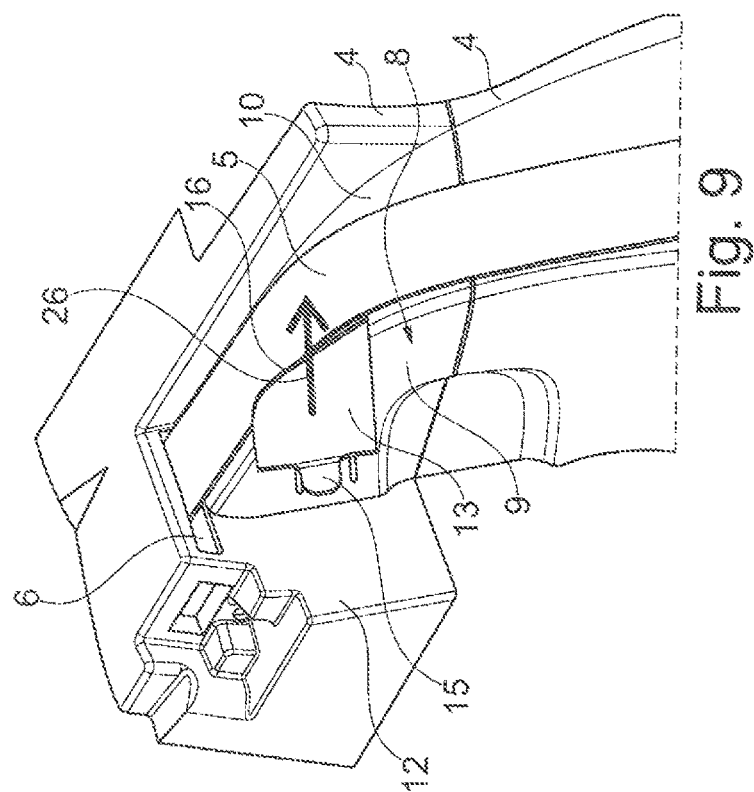
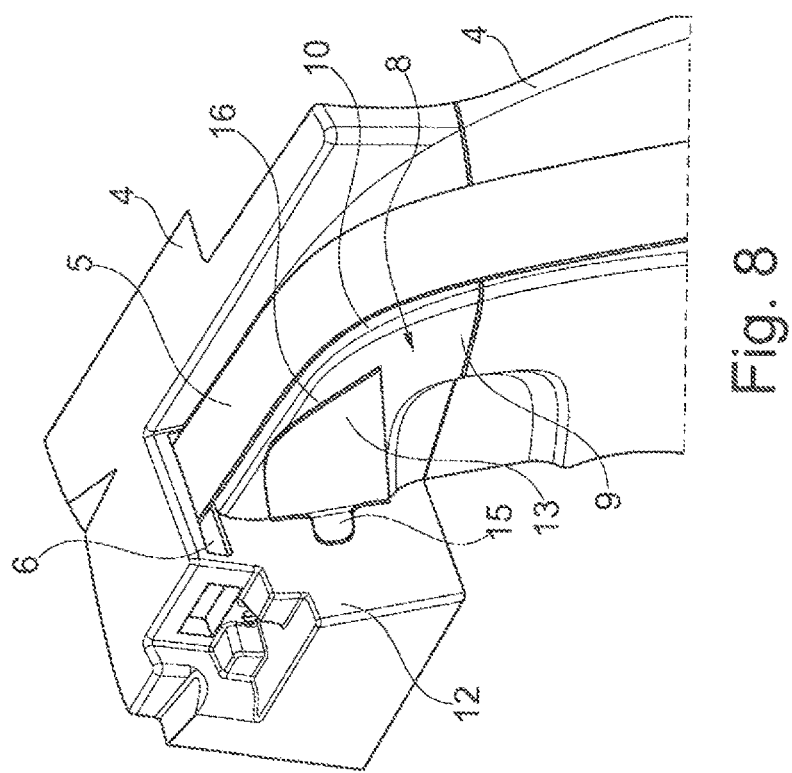

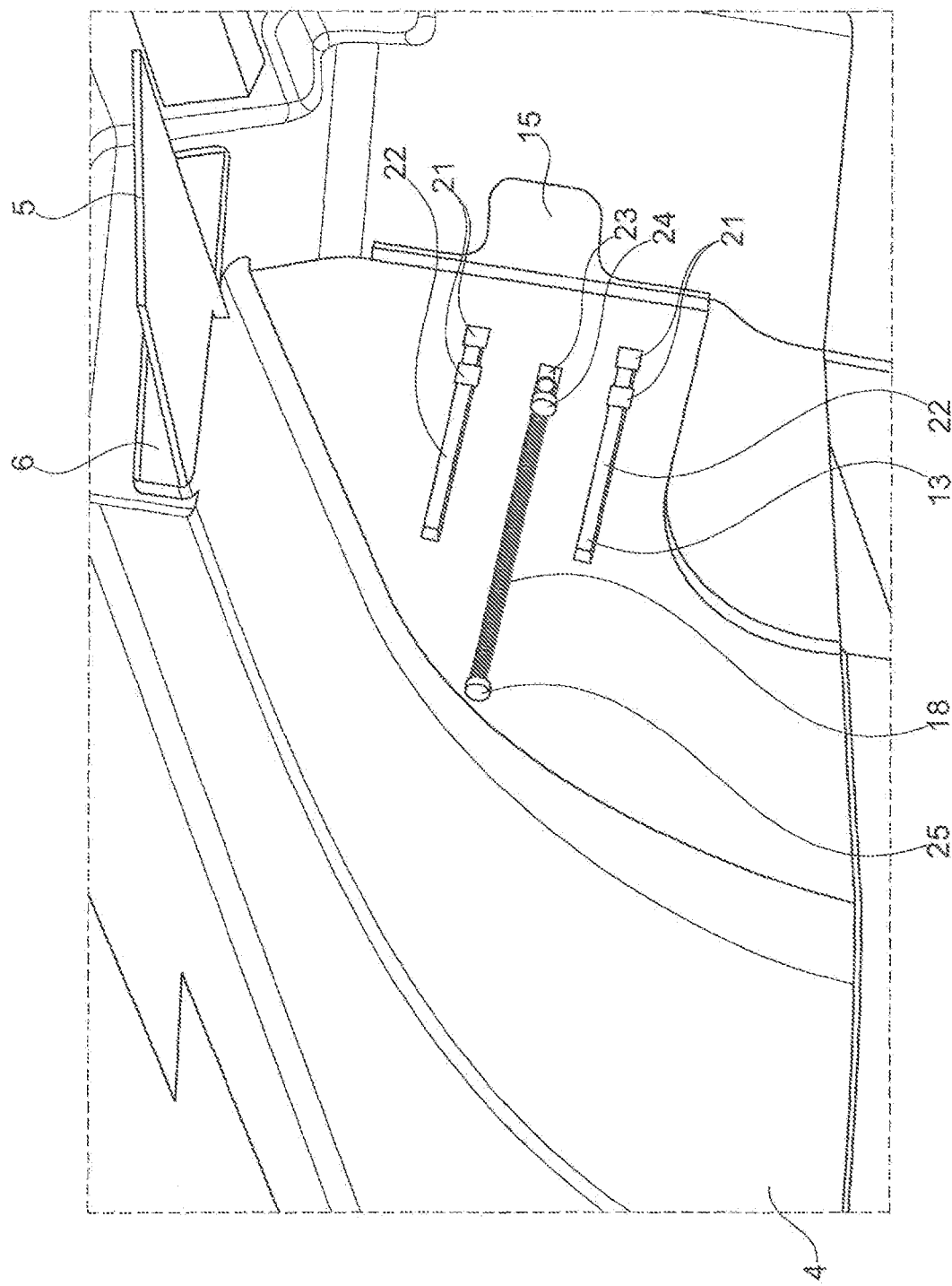

MOTOR VEHICLE WITH FOLDABLE BACKSEAT AND SAFETY BELT ASSIGNED TO THE SAME

CROSS-REFERENCE TO RELATED APPLICATION

This application claims priority to German Patent Application No. 102014007946.5, filed May 24, 2014, which is incorporated herein by reference in its entirety.

TECHNICAL FIELD

This present disclosure pertains to a motor vehicle such as a passenger car with a back seat, stationary lateral parts arranged next to a backrest of the back seat and a safety belt assigned to the back seat.

BACKGROUND

In general, a rear or back seat arrangement of a motor vehicle, one or two split back seats are foldable towards the front for enlarging a luggage space. Safety belts are attached on the two outer back seats in a three-point arrangement. A belt connection point in each case is located above and behind a back seat lateral edge. A further belt connection point is located below the back seat lateral edge, approximately at the height of the seat surface. Accordingly, a belt that is not applied with back seat folded up, i.e. in usage position, runs in the region of the back seat lateral edge and an adjoining lateral part on the body side, which for example can be a lateral upholstery or a lateral covering. Because of this, the belt during the pivoting of the back seat, in particular during the pivoting back into a folded-over back seat position can interfere because the belt in the region of the back seat lateral edge snags on the backrest and is undesirably moved along or trapped between backrest and lateral covering or backrest and a device for locking the backrest.

DE 10 2011 118 013 A1 discloses a passenger car with a back seat, a stationary lateral part and a safety belt. The back seat includes a backrest which is foldable from the position of use into the folded position and vice versa. The backrest includes a downward slope towards the lateral part, on which the safety belt, during the moving of the backrest from the usage position into the folded position, rests. During movement of the backrest from the usage position into the folded position, the safety belt is entirely transferred to the lateral part via the slope. Through this configuration, a defined placement of the safety belt following the pivoting of the backrest from its usage position into its folded position outside the pivot range of the backrest is ensured, by way of which subsequent trapping of the belt while transferring of the backrest from the folded position into the usage position is prevented. However, the particular design of the backrest with the slope is required for this purpose and may be limiting in design options of vehicle.

SUMMARY

The present disclosure is provide a configuration such that a belt that is erroneously located above the gap between backrest and lateral part is returned into the correct parking position on the lateral part through the folding of the backrest and during the folding back of the backrest trapping of the belt is effectively prevented. This configuration is suitable for motor vehicle and in particular a passenger car.

In the case of this passenger car, a backrest of the back seat can be pivoted out of a usage position into a folded position and vice versa. A lateral part is arranged next to the backrest which is located in the usage position in the region of an end of the backrest facing away from the pivot axis of the backrest. A gap, also called split line, is formed between the backrest and the lateral part. The safety belt rests on a contact surface of the lateral part adjacent to the gap. It is important that in the lateral part a guide element is mounted which is arranged in the gap. This guide element is moveable out of an operative position, in which it partially projects out of the gap, into a non-operational position, in which it is completely retracted into the gap, and vice versa. The guide element, in the operative position, projects over the contact surface of the lateral part, on which the safety belt rests. The guide element is moved by the backrest, during the pivoting from the operative usage position into the non-operative position against a spring force. Accordingly, the guide element under the effect of the spring force is extended from the non-operative position into the operative position during the pivoting of the backrest out of the usage position, consequently in particular when the backrest no longer holds back the guide element against the effect of the spring force.

The described configuration requires that a safety belt which is inadvertently arranged over the gap between the backrest and the stationary lateral part is brought back into the correct parking position by folding the backrest out of its usage position, in which the belt rests on the contact surface of the lateral part. The guide element which is then in the operative position constitutes a lateral stop for the safety belt towards the gap and thus prevents the trapping of the belt during the folding back of the backrest.

According to a preferred further development the guide element is designed as a plate-shaped element. Because of the plate-shaped configuration of the guide element, the same requires very little space and can thus be arranged in particular in a plane parallel to the gap, perpendicularly to the pivot axis of the backrest.

The guide element is preferably connected to an attachment. The backrest, during its pivoting into the usage position, contacts the attachment, moving the guide element into the non-operative position. With constructionally very simple design, the guide element is transferred from its non-operative position into its operative position. When the backrest is moved against the attachment during the pivoting into the usage position, a driving movement of the guide element results during the further pivoting of the backrest and thus transfers the guide element into its non-operative position in which it is completely retracted into the gap on reaching the usage position of the backrest. The guide element and the attachment form in particular a component which may be either plastic or metal.

The attachment is arranged at a right angle to the flat guide element. The spring force for loading the guide element or the arrangement of guide element and attachment can be generated in different ways. It is considered to be particularly advantageous when a coil spring or a helical tension spring for generating the spring force is provided. The respective spring on the one hand is mounted in the guide element or the attachment and on the other hand mounted in a stationary manner, in particular mounted in the stationary lateral part.

Different movements of the guide element are possible in order to achieve the effect according to the present disclosure during the transferring of the guide element from the non-operative position into the operative position. Accordingly, an embodiment provides that the guide element is shiftably mounted, in particular linearly shiftable in the lateral part. According to another embodiment, the guide element is pivotably mounted in the lateral part.

Preferably, the lateral part is configured so that it has a passage opening for the safety belt and the passage opening, in the direction of a belt buckle of the safety belt, follows the contact surface of the lateral part. This contact surface includes a downward slope facing away from the passage opening. In the case of rolled-up non-applied safety belt, the same rests on the contact surface of the lateral part, and in particular on the downward slope of the contact surface. With this configuration the guide element is provided in the non-operative position, facing the upper end of the slot and having a plate face end with a contour which corresponds to the contour of the contact surface in the region adjacent to the guide element, coinciding with the same. Accordingly, the guide element in its non-operative position is completely retracted into the slot between lateral part and folded-back backrest, wherein the guide element is directly moved out of the slot under the effect of the spring force after the pivoting of the backrest out of its usage position.

BRIEF DESCRIPTION OF THE DRAWINGS

The present disclosure will hereinafter be described in conjunction with the following drawing figures, wherein like numerals denote like elements.

FIG. 8 shows another embodiment of the passenger car, with a linearly shiftable guide element, illustrated fir the arrangement according to FIG. 5, however without the backrest in usage position and with the guide element in non-operative position;

FIG. 9 shows the arrangement according to FIG. 8, with guide element in operative position, accordingly for the state of the position folded forward out of the usage position; and FIG. 10 shows a detail representation of stationary lateral part shown in FIG. 8, the guide element with attachment and safety belt and a spring, which acts between lateral part and guide element, illustrated for the non-operative position of the guide element.

DETAILED DESCRIPTION

The following detailed description is merely exemplary in nature and is not intended to limit the present disclosure or the application and uses of the present disclosure. Furthermore, there is no intention to be bound by any theory presented in the preceding background of the present disclosure or the following detailed description.

Figure 1:
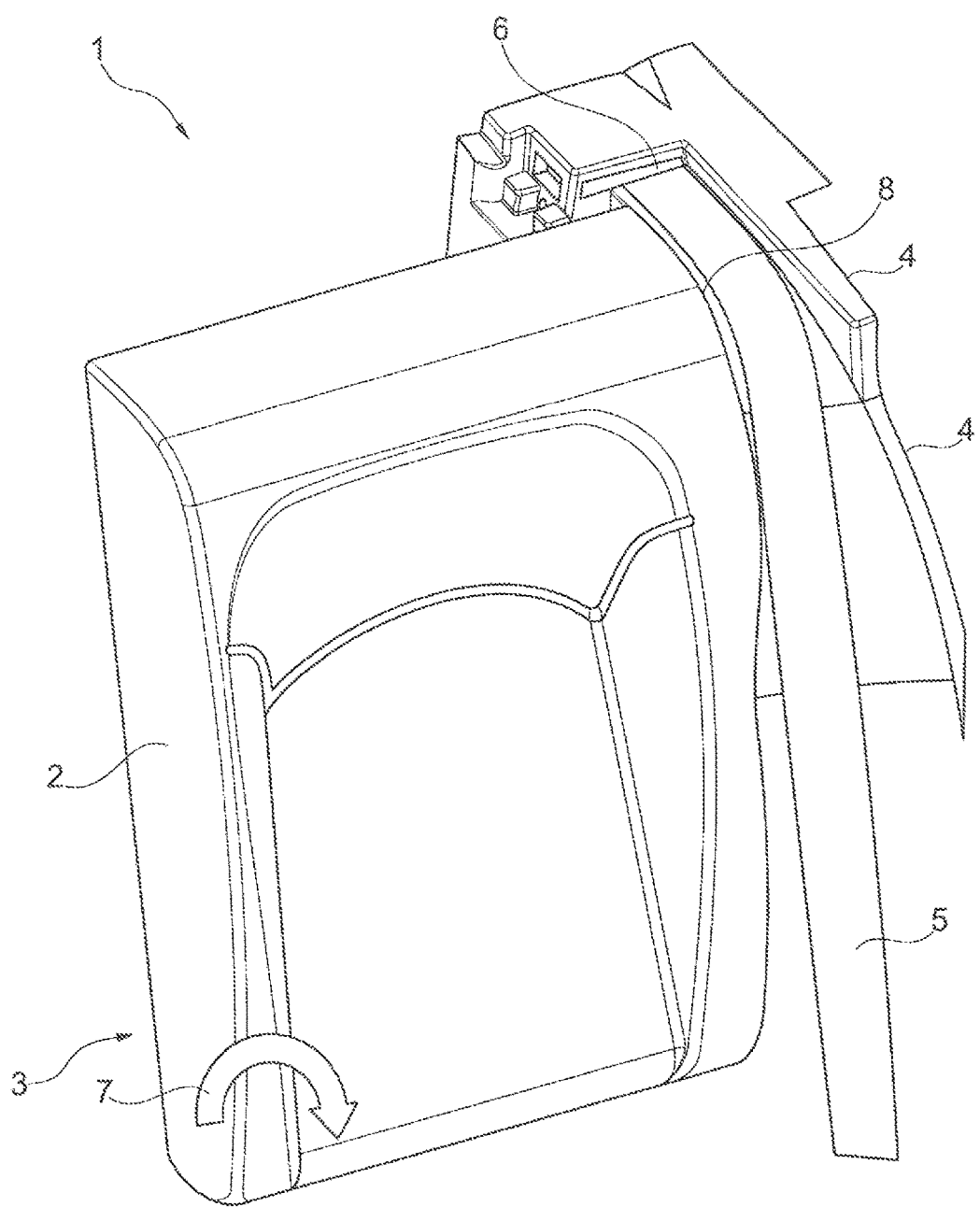
FIG. 1 shows a perspective view of a backrest for a back seat of a passenger vehicle arranged in usage position and a stationary lateral part arranged next to the backrest and over a partial length of a safety belt.

FIG. 1 shows a motor vehicle 1, which is designed as a passenger car having a backrest 2 of a back seat 3 in usage position, and a stationary lateral part 4 arranged next to the backrest 2 and a safety belt 5 arranged in the region of the lateral part 4. The lateral part 4 includes plastic and is arranged between the backrest 2 and a side wall of the motor vehicle 1. Based on the forward driving direction of the motor vehicle 1, the lateral part 4, behind the backrest 2, at the height of the upper limitation of the backrest 2, includes a slot 6 extending in transverse direction of the motor vehicle 1 and horizontally for the safety belt 5 to pass through. The safety belt 5 is diverted in the region of the slot 6. The safety belt 5 is rolled up on a reel (not shown) arranged below the lateral part 4. The backrest 2 can be folded forward according to the illustrated arrow 7 from the shown usage position into a position of non-usage in which the backrest 2 is substantially arranged horizontally and serves for extending a load compartment of the motor vehicle 1, which is arranged behind the back seat 3.

A gap 8 between the backrest 2 in usage position and the lateral part 4 is formed. The plane of the gap runs substantially perpendicularly to the pivot axis of the backrest 2. Because of this gap 8 there is the risk that the safety belt 5 with its edge facing the gap 8 is pulled into the gap 8.

Figure 2:
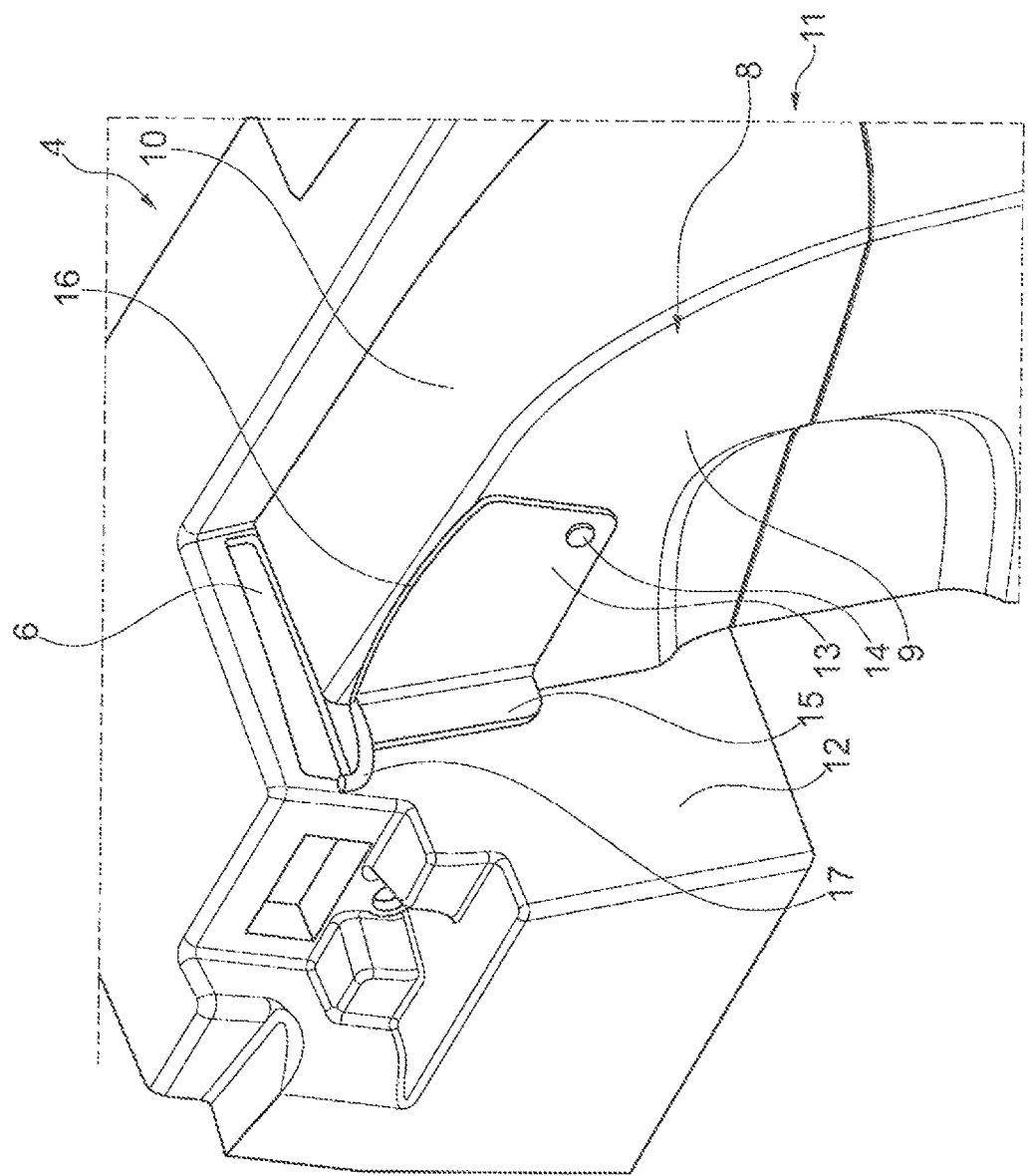
FIG. 2 shows perspective view of a portion of the stationary lateral part with guide element pivotably mounted in the same.

With reference not to FIGS. 2-7, an embodiment of the motor vehicle 1 configured according to the present disclosure is explained. FIG. 2 shows a portion of the lateral part 4. This lateral part 4 includes a face 9 limiting the gap 8, which substantially runs in a plane perpendicularly to the pivot axis of the backrest, and an upper contact surface 10 for the safety belt 5. The contact surface 10 follows the passage opening 6 in the lateral part 4 towards the front, i.e. in the direction of a belt buckle of a three-point safety belt arrangement. The contact surface 10 includes a downward slope towards the front, illustrated by the region 11. The lateral part 4 furthermore includes a contact surface 12 which extends almost vertically and which the backrest 2 abuts in its usage position at the back.

Spaced from the contact surface 12, a plate-shaped guide element 13 is pivotably mounted in the lateral part 2. The bearing axis 14, about which the guide element 13 is pivotable, is arranged spaced from the contact surface 12 and spaced from the contact surface 10. The guide element 13 is arranged at a small distance from the face 9 and pivotable parallel to the same. The plate, which forms the guide element 13, is substantially configured trapezium-shaped, the long parallel side of the trapezium being curved slightly towards the outside. A attachment 15, which substantially includes a right angle with the guide element 13, is connected to the short side of the guide element 13 facing the contact surface 12. In the non-operative position of the guide element 13 illustrated in FIG. 2, the attachment 15 areally abuts the contact surface 12 of the lateral part 4 and the plate face end 16 of the guide element 13 in its region that is maximally curved towards the outside does not project over the contact surface 10 but terminates flush with the same at the height of the contact surface 10. In the upper region of the attachment 15, the same is provided with a guide hook 17 bent towards the inside, extending towards the top, thus directed away from the contact surface 10 and extending to the level of the passage opening 6. The same is to ensure that the safety belt 5 is precisely rolled up when taken off.

Figure 3:
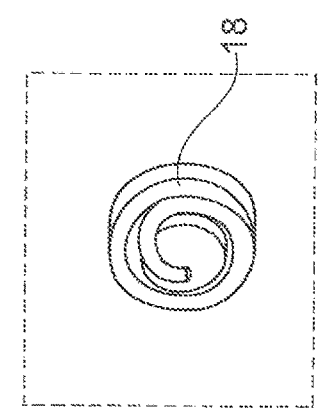
FIG. 3 shows a perspective view a spring element employed with the embodiment according to FIG. 2, which is effective between the lateral part and the guide element.

The guide element 13 is pre-tensioned by a spring 18. As shown in FIG. 3, the spring may be a torsion spring, which penetrates the axis 14, wherein the spring 18 in the region of an end is hooked into the lateral part 4 and in the region of the other end hooked into the guide element 13. In the operative position (see FIG. 5), the guide element 13 projects over the contact surface 10. The guide element 13 can be moved from the operative position (FIG. 5) into the non-operative position (FIG. 2) against the force of the spring 18 by the backrest 2 because of the contact with the attachment 15 during the pivoting of the backrest 2 in the usage position.

Figure 4:
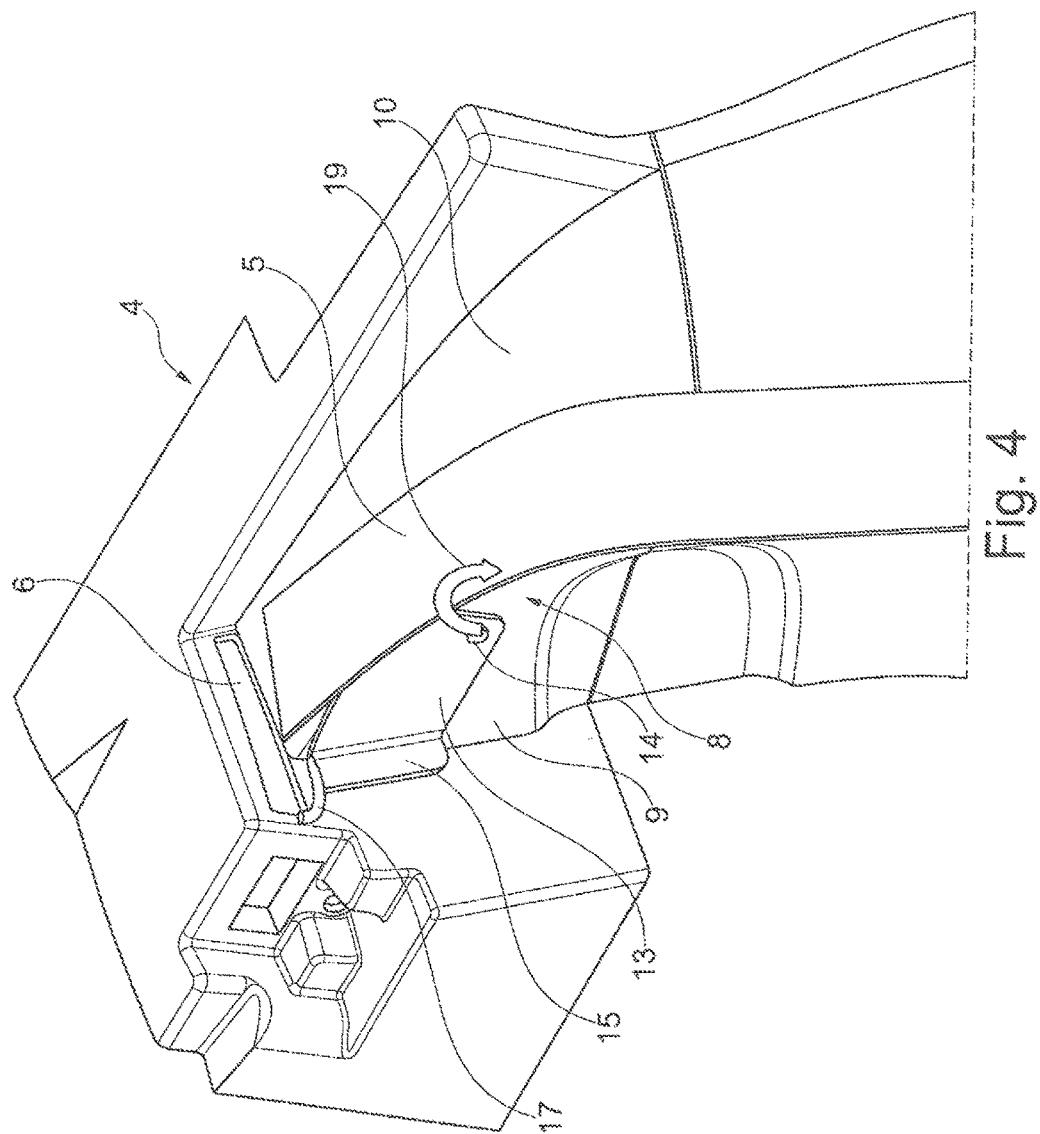
FIG. 4 shows the arrangement according to FIG. 2, and additionally illustrates a portion of the safety belt, which is pulled over a gap between lateral part and non-illustrated backrest, with guide element in non-operative position.

FIG. 2 shows the motor vehicle 1 without backrest. The backrest 2 is in usage position and thus acts on the attachment 15, which is pressed against the contact surface 12. The guide element 13 is thus in its non-operative position. For this usage position of the backrest 2, FIG. 4 shows that because of a faulty handling of the safety belt 5 the same does not precisely lie on the lateral part 4, specifically the contact surface 10, but is pulled obliquely into the region of the backrest, namely over the gap 8 between lateral part 4 and backrest 2. The safety belt 5 is thus arranged above the guide element 13, which is in non-operative position.

When the backrest 2 is pivoted into the position of non-usage, thus folded forward, the backrest 2 is out of contact with the attachment 15, so that under the effect of the spring 18 the guide element 13 pivots in accordance with the arrow 19 according to FIG. 4 and completely pushes the safety belt 5, should it extend into the region above the gap 8, over the contact surface 110 of the lateral part 4. In the process, the safety belt 5 slides off on the plate face end 16 during the pivoting of the guide element 13, in the direction of the arrow 20 according to FIG. 4.

Figure 5:
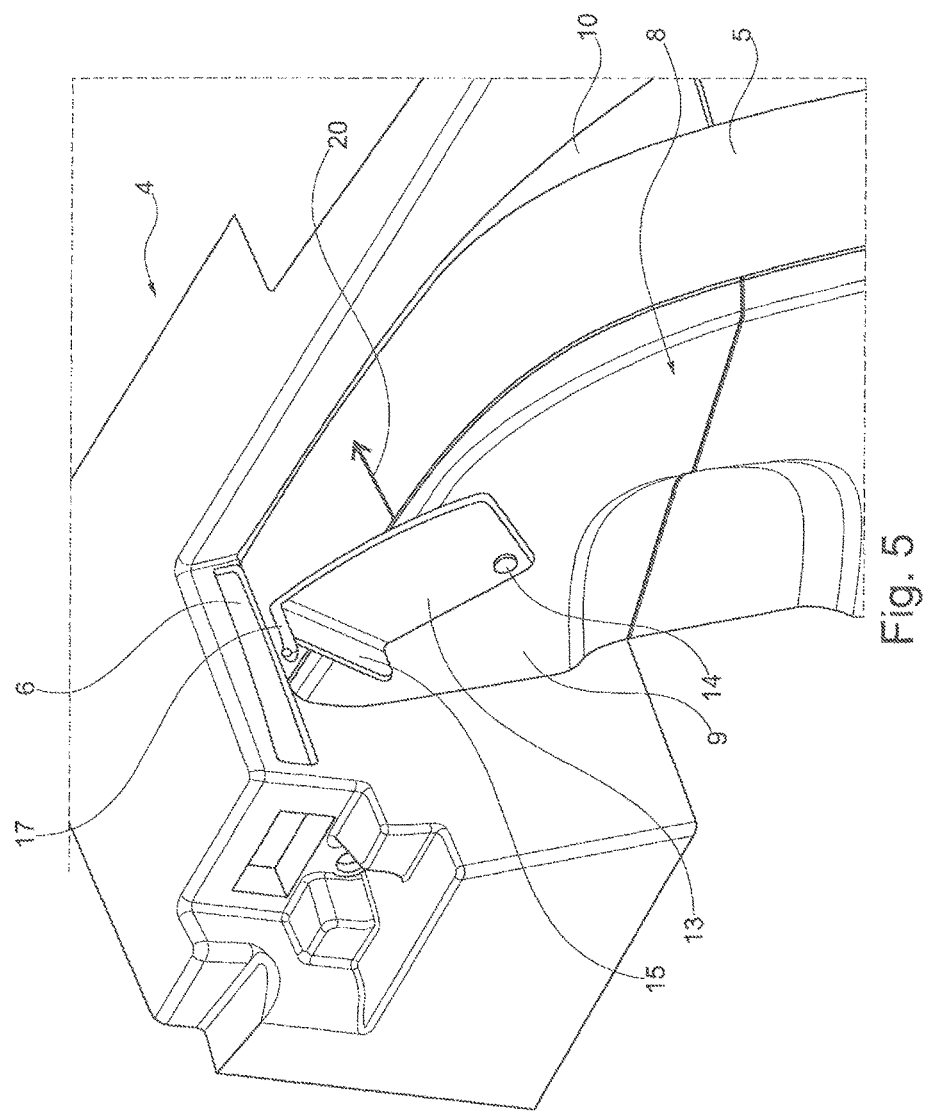
FIG. 5 shows the arrangement according to FIG. 4, with guide element in operative position and safety belt arranged next to the same.
Figure 6:
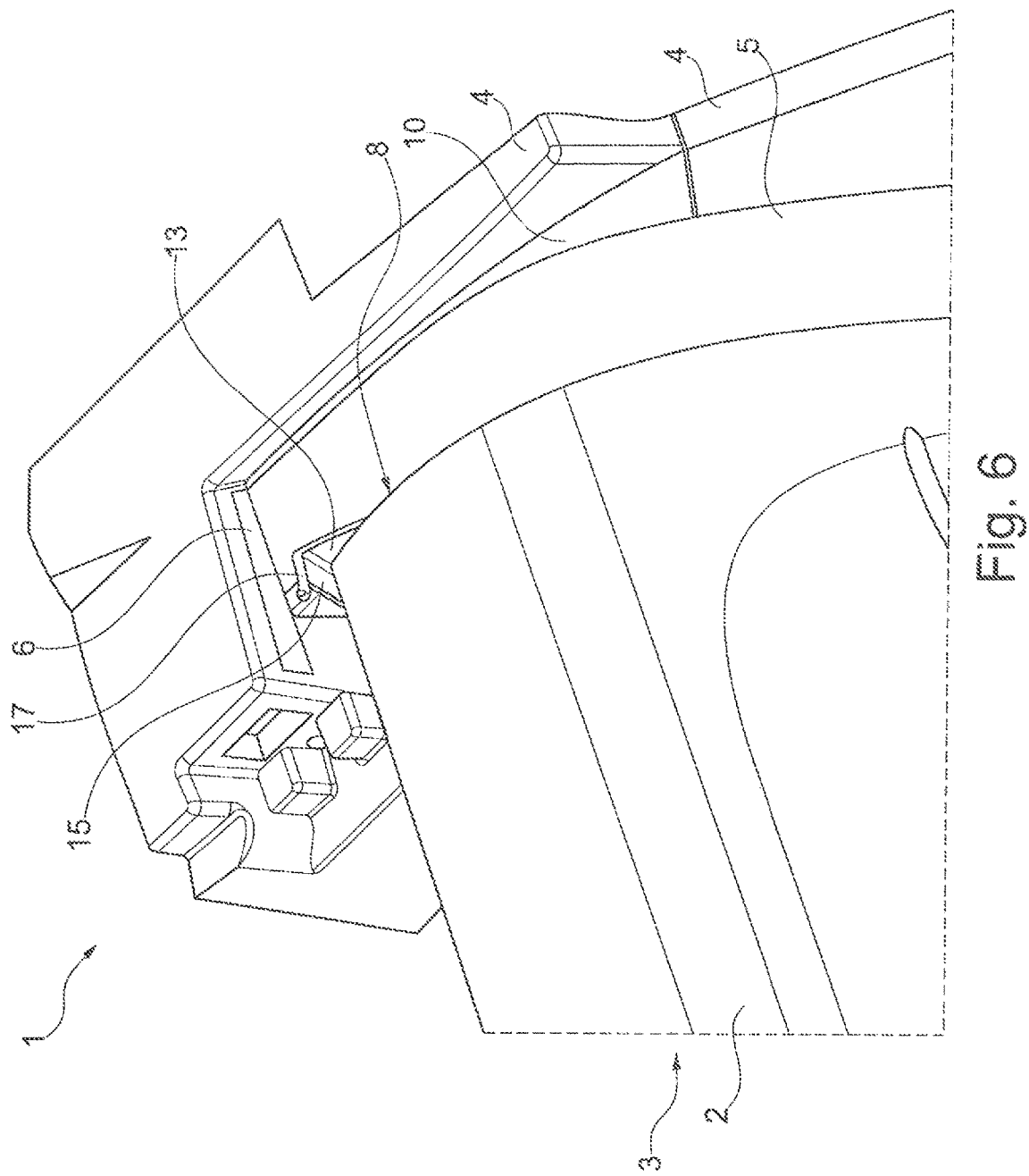
FIG. 6 shows the arrangement according to FIG. 5, with backrest pivoted back almost in the usage position, upon contact of the backrest with all attachment connected to the guide element.

FIG. 6 shows an intermediate position of the guide element 13 between the non-operative position according to FIG. 4 and the operative position according to FIG. 5, however illustrated with the backrest 2 which, following disabling of a locking of the backrest 2, is slightly pivoted out of its usage position, while the attachment 15 still abuts the backrest 2.

Figure 7:
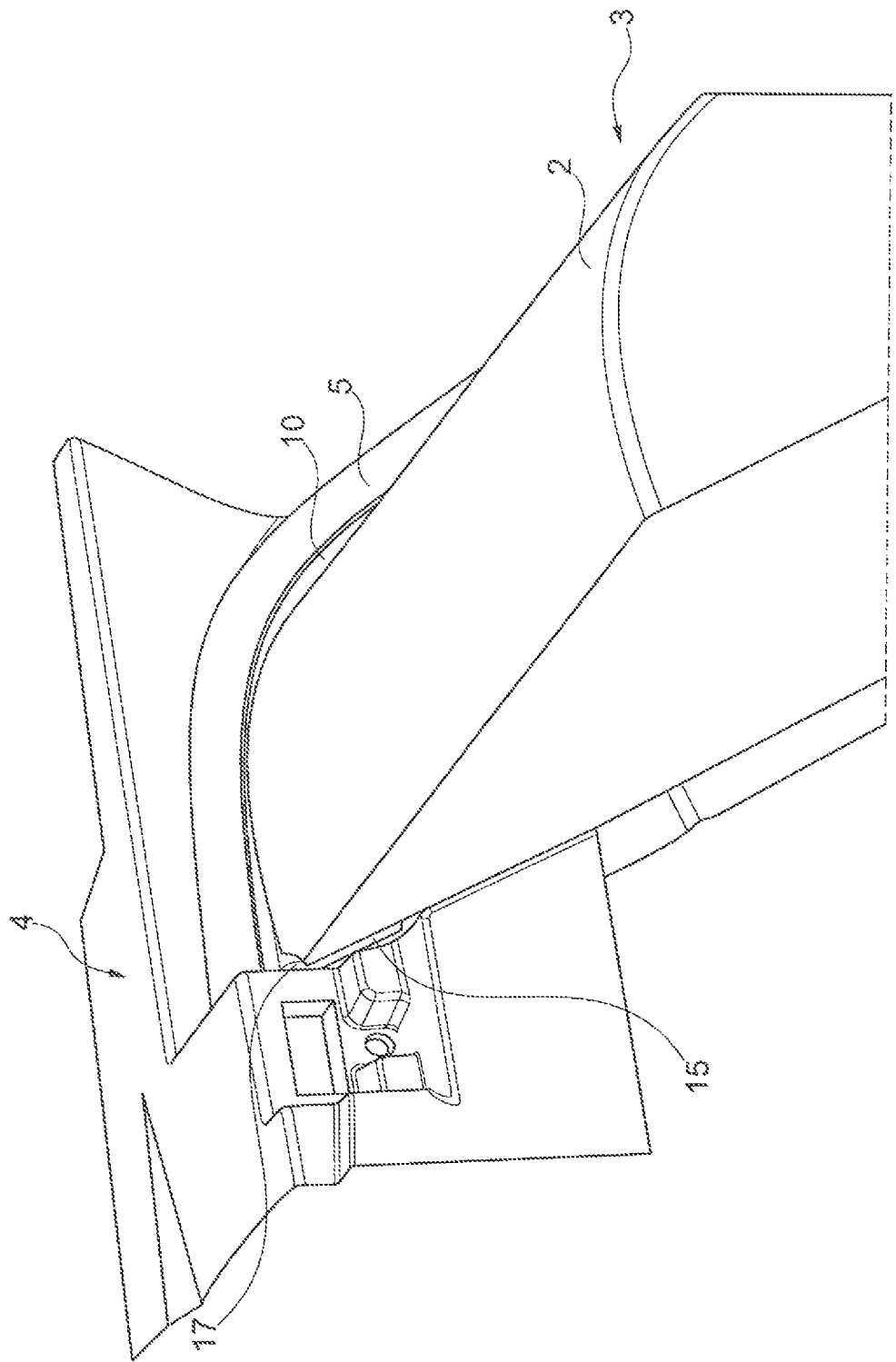
FIG. 7 shows the arrangement according to FIG. 6, illustrated in the usage position of the backrest.

FIG. 7 shows the arrangement according to FIG. 6, thus with illustrated backrest 2, with backrest 2 in usage position, which presses the attachment 15 against the contact surface 12 of the lateral part 4, the guide element 13 thus being in its non-operative position.

The present disclosure thus provides trapping protection for the safety belt 5. A safety belt 5 inadvertently located above the gap 8 is returned through the folding of the backrest 2 out of the usage position into the correct parking position on the contact surface of the lateral part 4. Following this, the guide element 13 in its operative position fixes this belt position and prevents the trapping of the belt during the folding-back of the backrest 2 into its usage position.

Another embodiment according to FIGS. 8 to 10 differs from the embodiment illustrated in FIGS. 2-7 in that instead of a pivotable guide element 13, the guide element 13 is linearly shiftable. In this regard, reference is made in principle to the above description of the embodiment shown in FIGS. 2-7.

In the exemplary embodiment according to FIGS. 8 to 10, the guide element 13 and the attachment 15 likewise form a component. The guide element 13 is guided via projections 21 in two guide slots 22 running parallel, which penetrate the face 9 of the lateral part 4. Between the two guide slots 24, a further slot 23 extending parallel to the same is arranged in the lateral part 4. The slot 23 is penetrated by a pin 24 connected to the guide element 13. The spring 18 acts on this pin with an end, while the other end acts on a projection 25 of the lateral part 4. The spring 18 is designed as a helical tension spring. The spring 18 thus has a tendency towards moving the guide element 13 into its operative position.

The plate face end 16 of the guide element 13 with this exemplary embodiment is configured in such a manner that the plate face end in the non-operative position of the guide element 13 terminates with the contact surface 10 of the lateral part 4 in the region of the lateral part 4 facing the guide element 13 and this plate face end 16 projects over the contact surface in the operative position of the guide element 13. The arrow 26 in FIG. 9 illustrates the extension direction of the guide element 13.

In the usage position of the backrest 2, the same contacts the attachment 15. Accordingly, the guide element 13 is in its non-operative position according to FIG. 8. When the backrest 2 is pivoted forward out of its usage position and out of contact with the attachment 15, the guide element 13 is in the operative position according to FIG. 9. The guide element 13 has been pulled into this operative position because of the effect of the spring 18.

With respect to the specific mode of operation of this embodiment, reference is made to the explanations regarding the embodiment shown in FIGS. 2-7.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A back seat assembly for motor vehicle comprising:
    a backrest configured to pivot out of a usage position into a folded position;
    a stationary lateral part arranged next to the backrest when in the usage position such that a gap is formed in the region of an end of the backrest facing away from the pivot axis of the backrest, the lateral part having a contact surface;
    a safety belt adjacent to the gap configured to rest on the contact surface; and
    a guide element arranged in the gap and positionable from an operative position partly projecting out of the gap and over the contact surface to a non-operative position completely retracted into the gap, wherein the guide element is moved against a biasing force by the backrest pivoting into the usage position from the operative position into the non-operative position.

2. The back seat assembly according to claim 1, wherein the guide element comprises a plate-shaped element.

3. The back seat assembly according to claim 2, wherein the guide element is arranged in a plane parallel to the gap perpendicularly to a pivot axis of the backrest.

4. The back seat assembly according claim 1, further comprising attachment connected to the guide element, wherein the backrest contacts the attachment and moves the guide element into the non-operative position upon pivoting into the usage position.

5. The back seat assembly according claim 1, further comprising a spring configured to generate the biasing force.

6. The back seat assembly according claim 5, wherein the spring comprises a coil spring.

7. The back seat assembly according claim 5, wherein the spring comprises a helical tension spring.

8. The back seat assembly according claim 1, wherein the guide element is shiftably mounted in the lateral part.

9. The back seat assembly according claim 8, wherein the guide element is linearly shiftably in the lateral part.

10. The back seat assembly according to claim 8, wherein the guide element is pivotably mounted in the lateral part.

11. The back seat assembly according to claim 1, wherein the lateral part comprises a passage opening for the safety belt formed therein such that the contact surface follows the passage opening in the direction of a belt buckle of the safety belt, which has a downward slope when facing away from the passage opening.

12. The back seat assembly according to claim 11, wherein the guide element comprises a plate face end facing the upper end of the gap in the non-operative position, the pate face end having a contour which corresponds to the contour of the contact surface in a region adjacent to the guide element.

* * * * *